United States Patent
Hirota et al.

(10) Patent No.: US 10,142,513 B2
(45) Date of Patent: Nov. 27, 2018

(54) IMAGE FORMING APPARATUS THAT CORRECTS POSITION CORRECTION OF IMAGE FORMED ON SHEET

(71) Applicant: CANON KABUSHIKI KAISHA, Tokyo (JP)

(72) Inventors: Kenichi Hirota, Joso (JP); Hiroshi Kokubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/334,677

(22) Filed: Oct. 26, 2016

(65) Prior Publication Data

US 2017/0142286 A1 May 18, 2017

(30) Foreign Application Priority Data

Nov. 12, 2015 (JP) ................................ 2015-222439

(51) Int. Cl.
  *G06F 3/12* (2006.01)
  *H04N 1/00* (2006.01)
  *H04N 1/387* (2006.01)

(52) U.S. Cl.
  CPC ....... *H04N 1/3873* (2013.01); *H04N 1/00795* (2013.01); *H04N 1/3878* (2013.01)

(58) Field of Classification Search
  CPC ............. H04N 1/00795; H04N 1/3873; H04N 1/3878; G03G 15/0194; G06G 2215/0132; G06G 2215/0161

USPC .......................... 358/1.1–1.18, 402; 399/301
See application file for complete search history.

(56) References Cited

U.S. PATENT DOCUMENTS

| | | | | |
|---|---|---|---|---|
| 7,548,326 B2* | 6/2009 | Fukushima | ........ | H04N 1/00002 347/116 |
| 2010/0239331 A1* | 9/2010 | Miyadera | ........... | G03G 15/0194 399/301 |
| 2011/0235129 A1* | 9/2011 | Ohkawa | ............. | H04N 1/00002 358/406 |
| 2013/0278945 A1* | 10/2013 | Ono | ..................... | G03G 15/041 358/1.2 |
| 2015/0070732 A1* | 3/2015 | Kishi | ................. | G03G 15/5062 358/3.27 |
| 2017/0104888 A1* | 4/2017 | Nomura | ............... | H04N 1/3878 |

FOREIGN PATENT DOCUMENTS

JP  2003-173109 A  6/2003

* cited by examiner

*Primary Examiner* — Gabriel Garcia
(74) *Attorney, Agent, or Firm* — Fitzpatrick, Cella, Harper & Scinto

(57) ABSTRACT

An image forming apparatus forms a measurement image on a sheet, moves a carriage to read the measurement image, reads from a storage unit an adjustment condition, generates a correction condition based on the adjustment condition and a result of reading the measurement image, moves the carriage to read an original, generates image data of the original, corrects a position at which an image is formed on a sheet based on the correction condition and forms an image of the original on a sheet based on the corrected image data.

9 Claims, 13 Drawing Sheets

FIG. 4A

| | SHEET NAME | SUB SCANNING DIRECTION SHEET LENGTH (mm) 511 | MAIN SCANNING DIRECTION SHEET LENGTH (mm) 512 | GRAMMAGE (g/m²) 513 | SURFACE PROPERTY 514 | COLOR 515 | PRE-PRINT PAPER 516 | POSITION MISALIGNMENT AMOUNT (FRONT SURFACE) 517 | POSITION MISALIGNMENT AMOUNT (BACK SURFACE) 520 521 |
|---|---|---|---|---|---|---|---|---|---|
| 501 | ABC PAPER RECYCLED 1 | 210 | 297 | 75 | NORMAL PAPER | WHITE | No | READ POSITION:0.3mm SIDE POSITION:-0.1mm MAIN SCAN SCALING FACTOR:+0.02% SUB SCAN SCALING FACTOR:+0.01% | READ POSITION:0.2mm SIDE POSITION:0.1mm MAIN SCAN SCALING FACTOR:0.02% SUB SCAN SCALING FACTOR:0.03% |
| 502 | ABC PAPER RECYCLED 2 | 297 | 420 | 75 | NORMAL PAPER | WHITE | No | READ POSITION:0.0mm SIDE POSITION:-0.0mm MAIN SCAN SCALING FACTOR:+0.00% SUB SCAN SCALING FACTOR:+0.00% | READ POSITION:0.0mm SIDE POSITION:-0.0mm MAIN SCAN SCALING FACTOR:-0.0mm SUB SCAN SCALING FACTOR:+0.00% |
| 503 | DEF PAPER EMBOSSED A-1 | 216 | 279 | 150 | EMBOSSED | WHITE | No | READ POSITION:0.5mm SIDE POSITION:-0.5mm MAIN SCAN SCALING FACTOR:+0.02% SUB SCAN SCALING FACTOR:+0.02% | READ POSITION:-0.3mm SIDE POSITION:0.5mm MAIN SCAN SCALING FACTOR:+0.01% SUB SCAN SCALING FACTOR:-0.03% |
| 504 | DEF PAPER COATED PAPER P-1 | 279 | 432 | 128 | DOUBLE-SIDED COATING | WHITE | No | READ POSITION:0.4mm SIDE POSITION:-0.2mm MAIN SCAN SCALING FACTOR:+0.12% SUB SCAN SCALING FACTOR:+0.08% | READ POSITION:-0.2mm SIDE POSITION:0.6mm MAIN SCAN SCALING FACTOR:-0.02% SUB SCAN SCALING FACTOR:-0.01% |

F I G. 4B

| | SHEET NAME (511) | SUB SCANNING DIRECTION SHEET LENGTH (mm) (512) | MAIN SCANNING DIRECTION SHEET LENGTH (mm) (513) | GRAMMAGE (g/m²) (514) | SURFACE PROPERTY (515) | COLOR (516) | PRE-PRINT PAPER (517) | POSITION MISALIGNMENT AMOUNT (FRONT SURFACE) (520) | POSITION MISALIGNMENT AMOUNT (BACK SURFACE) (521) |
|---|---|---|---|---|---|---|---|---|---|
| 505 | XYZ PAPER COLOR 81 | 210 | 297 | 75 | NORMAL PAPER | ORANGE | No | READ POSITION:0.0mm SIDE POSITION:-0.0mm MAIN SCAN SCALING FACTOR:+0.00% SUB SCAN SCALING FACTOR:+0.00% | READ POSITION:0.0mm SIDE POSITION:-0.0mm MAIN SCAN SCALING FACTOR:+0.00% SUB SCAN SCALING FACTOR:+0.00% |
| 506 | XYZ PAPER COLOR 82 | 210 | 297 | 75 | NORMAL PAPER | PINK | No | READ POSITION:0.0mm SIDE POSITION:-0.0mm MAIN SCAN SCALING FACTOR:+0.00% SUB SCAN SCALING FACTOR:+0.00% | READ POSITION:0.0mm SIDE POSITION:-0.0mm MAIN SCAN SCALING FACTOR:+0.00% SUB SCAN SCALING FACTOR:+0.00% |
| 507 | FGH PAPER GRID 75 | 210 | 297 | 75 | NORMAL PAPER | WHITE | Yes | READ POSITION:0.0mm SIDE POSITION:-0.0mm MAIN SCAN SCALING FACTOR:+0.00% SUB SCAN SCALING FACTOR:+0.00% | READ POSITION:0.0mm SIDE POSITION:-0.0mm MAIN SCAN SCALING FACTOR:+0.00% SUB SCAN SCALING FACTOR:+0.00% |
| 508 | FGH PAPER NORMAL PAPER 2 | 210 | 297 | 75 | NORMAL PAPER | WHITE | No | READ POSITION:-0.03mm SIDE POSITION:-0.07mm MAIN SCAN SCALING FACTOR:+0.06% SUB SCAN SCALING FACTOR:-0.01% | READ POSITION:-0.03mm SIDE POSITION:-0.10mm MAIN SCAN SCALING FACTOR:+0.04% SUB SCAN SCALING FACTOR:+0.02% |

F I G. 6

| | MEASUREMENT VALUE | IDEAL VALUE | POSITION MISALIGNMENT AMOUNT |
|---|---|---|---|
| READ POSITION (FRONT SURFACE) | D+H/2 | 10.0mm | MEASUREMENT VALUE − IDEAL VALUE |
| SIDE POSITION (FRONT SURFACE) | C | 10.0mm | MEASUREMENT VALUE − IDEAL VALUE |
| MAIN SCAN SCALING FACTOR (FRONT SURFACE) | (MAIN SCANNING DIRECTION SHEET LENGTH) − (C+G) | (MAIN SCANNING DIRECTION SHEET LENGTH) − 20mm | (MEASUREMENT VALUE − IDEAL VALUE) / 2 |
| SUB SCAN SCALING FACTOR (FRONT SURFACE) | (SUB SCANNING DIRECTION SHEET LENGTH) − (D+H+F+J)/2 | (SUB SCANNING DIRECTION SHEET LENGTH) − 20mm | (MEASUREMENT VALUE − IDEAL VALUE) / 2 |
| READ POSITION (BACK SURFACE) | (SUB SCANNING DIRECTION SHEET LENGTH) − (D+H+F+J)/2 | 10.0mm | MEASUREMENT VALUE − IDEAL VALUE |
| SIDE POSITION (BACK SURFACE) | (SUB SCANNING DIRECTION SHEET LENGTH) − (D+H+F+J)/2 | 10.0mm | MEASUREMENT VALUE − IDEAL VALUE |
| MAIN SCAN SCALING FACTOR (BACK SURFACE) | (SUB SCANNING DIRECTION SHEET LENGTH) − (D+H+F+J)/2 | (MAIN SCANNING DIRECTION SHEET LENGTH) − 20mm | (MEASUREMENT VALUE − IDEAL VALUE) / 2 |
| SUB SCAN SCALING FACTOR (BACK SURFACE) | (SUB SCANNING DIRECTION SHEET LENGTH) − (D+H+F+J)/2 | (SUB SCANNING DIRECTION SHEET LENGTH) − 20mm | (MEASUREMENT VALUE − IDEAL VALUE) / 2 |
| SQUARENESS (FRONT SURFACE) | D−H / (MAIN SCANNING DIRECTION SHEET LENGTH) − 20 | 0.00mm | MEASUREMENT VALUE − IDEAL VALUE |
| SQUARENESS (BACK SURFACE) | D−H / (MAIN SCANNING DIRECTION SHEET LENGTH) − 20 | 0.00mm | MEASUREMENT VALUE − IDEAL VALUE |

FIG. 8
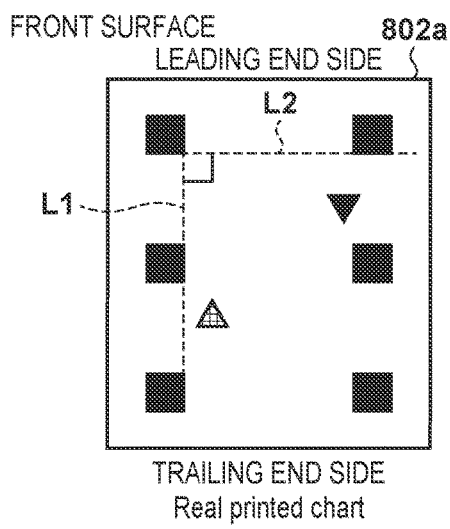
FRONT SURFACE 802a
LEADING END SIDE
TRAILING END SIDE
Real printed chart
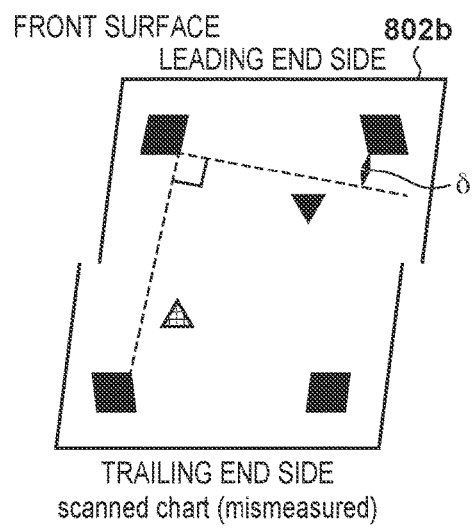
FRONT SURFACE 802b
LEADING END SIDE
TRAILING END SIDE
scanned chart (mismeasured)
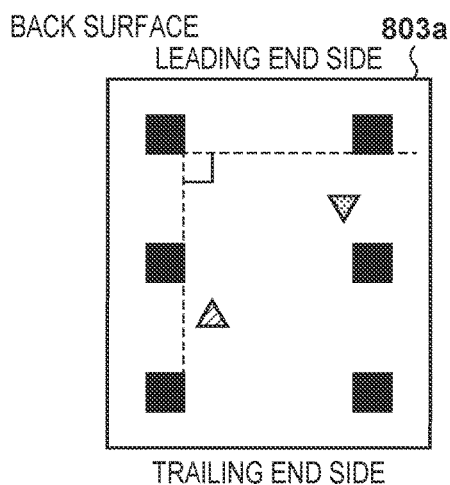
BACK SURFACE 803a
LEADING END SIDE
TRAILING END SIDE
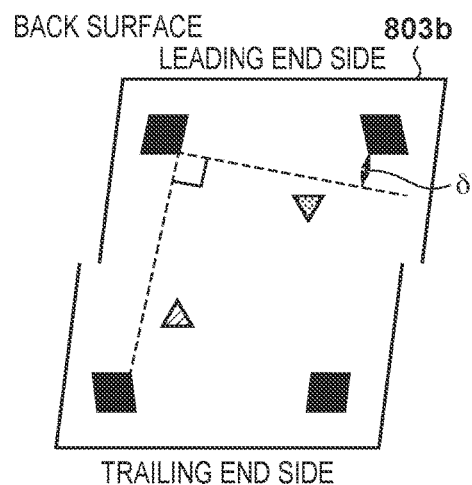
BACK SURFACE 803b
LEADING END SIDE
TRAILING END SIDE
X : MAIN SCANNING DIRECTION
(=D1: SCAN MOVEMENT DIRECTION)
Y : SUB SCANNING
DIRECTION

IMAGE FORMING APPARATUS THAT CORRECTS POSITION CORRECTION OF IMAGE FORMED ON SHEET

BACKGROUND OF THE INVENTION

Field of the Invention

The present invention relates to correction of a position correction of an image formed on a sheet.

Description of the Related Art

When an image is formed by an image forming apparatus, there are cases in which a formation position of the image is misaligned from an ideal position on a sheet. According to Japanese Patent Laid-Open No. 2003-173109, causing a sheet on which a reference image is formed to be read by a reading apparatus, and obtaining a distance from an end of the sheet to the reference image based on the read result to adjust the image formation position based on that distance is proposed.

Note that there are various reasons for an image formation position being misaligned from an ideal position on a sheet. For example, sometimes this is caused by a conveyance mechanism or a position misalignment due to a size or a grammage of a sheet. In any case, an amount of misalignment of an image formation position is established by reading a reference image formed on a sheet. An image forming apparatus forms an image at an ideal position on a sheet by correcting in advance the formation position of an image in accordance with such an amount of misalignment. However, an image formation position ceases to be correctly corrected when there is a read error caused by an individual difference in a reading apparatus. For example, there are reading apparatuses that employ a wire winding drive for wide scanning such as for an A3 size sheet. The carriage moves in a state in which it is slightly tilted with respect to a scan direction due to bending of a rail or eccentricity of a pulley used in a wire winding drive. As a result, a read error occurs due to the scan image also being tilted, and the image formation position correction precision is reduced.

SUMMARY OF THE INVENTION

The present invention increases image formation position correction precision by reducing an influence that an individual difference present in a reading apparatus exerts on a reference image read result.

The present invention provides an image forming apparatus comprising: a reading unit having a carriage that moves in a predetermined direction and illuminates an original, configured to read the original to generate image data; an image processing unit configured to execute image processing to the image data based on a correction condition; an image forming unit configured to form an image on a sheet based on the image data resulting from image processing being executed by the image processing unit; a storage unit configured to store an adjustment condition for reducing a read error caused by an individual difference of the reading unit; and a generation unit configured to control the image forming unit to form a measurement image on a sheet, to obtain read data corresponding to a result of reading the measurement image by the reading unit, and to generate a correction condition based on the read data and the adjustment condition, wherein the image processing unit, based on the correction condition, corrects a position at which the image is formed on the sheet.

Further features of the present invention will become apparent from the following description of exemplary embodiments (with reference to the attached drawings).

BRIEF DESCRIPTION OF THE DRAWINGS

FIGS. 4A and 4B are views illustrating a sheet management table.

FIG. 6 is a view for describing a method of obtaining an amount of misalignment of a parameter relating to an image formation position.

FIG. 8 is a view for describing an individual difference of a reading apparatus.

FIGS. 9A to 9H are views for describing a read result correction method.

DESCRIPTION OF THE EMBODIMENTS

<Image Forming Apparatus>

Figure 1:
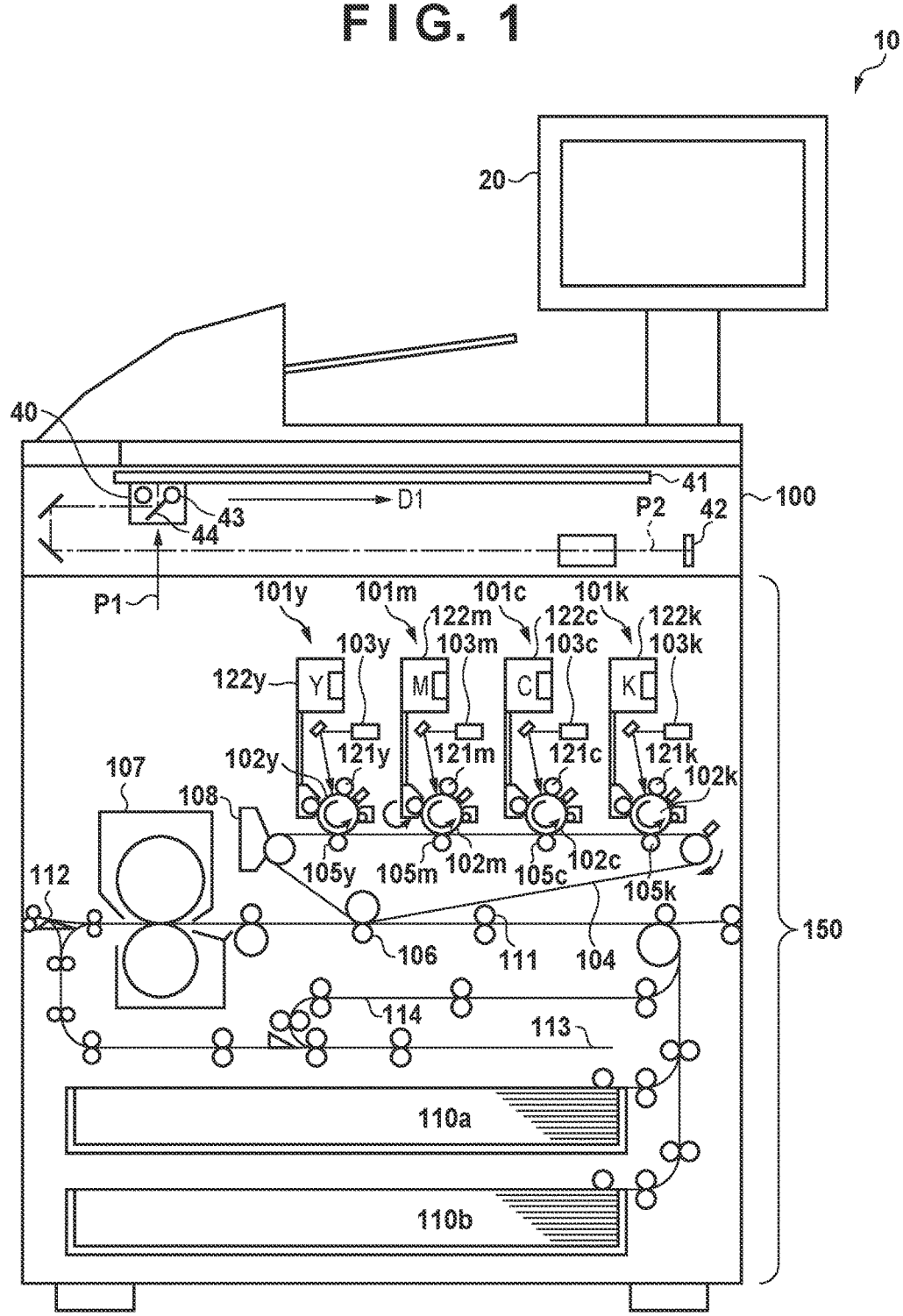
FIG. 1 is an overview cross-sectional view illustrating an image forming apparatus.

FIG. 1 is an overview cross-sectional view of an image forming apparatus 10. The image forming apparatus 10 includes a printer engine 150 and an image scanner 100. The printer engine 150 is an example of an image forming unit for forming an image on a sheet. The printer engine 150 may be an engine for forming a solid color image, but an engine for forming a mixed color image is employed here. The image scanner 100 functions as a reading unit for reading an image formed on a sheet or a measurement unit for measuring a position of a measurement image. These include an image sensor 42 such as a CCD or a CMOS sensor. When a copying of an original is instructed via an operation unit 20, the image scanner 100 reads an original placed on an original platen to generate image data. A carriage 40 including a light source 43 and a mirror 44 moves from a home position P1 to an end position P2 following a sub scanning direction Dl. Thereby, an image of the original is formed on the image sensor of the image scanner 100. The carriage 40 moves along a rail 41. The original is illuminated by the light source 43.

A plurality of image forming stations 101y, 101m, 101c, and 101k form a toner image using toners of different colors. The image forming station 101y forms a yellow image. The image forming station 101m forms a magenta image. The image forming station 101c forms a cyan image. The image forming station 101k forms a black image. In this way, y, m, c, and k added on the end of the reference numerals indicate the color of the toner, and the characters y, m, c, and k are omitted from the reference numeral when matters common to all colors are described. When image data is received from the image scanner 100 or a PC (personal computer, not shown), the image forming apparatus 10 forms an image corresponding to the image data on a sheet.

A photosensitive drum 102 rotates in an arrow symbol direction. The photosensitive drum 102 is charged uniformly by a charger 121. An exposure unit 103 exposes the photosensitive drum 102 based on the image data. Thereby an electrostatic latent image is formed on the photosensitive drum 102. The electrostatic latent image on the photosensitive drum 102 is developed by a developing unit 122. The developing unit contains a developing agent including a toner and a carrier and visualizes an electrostatic latent image as a toner image using the toner in the developing agent. Like this, the photosensitive drum 102 is an image carrier for carrying an electrostatic latent image and a toner image. A yellow toner image is formed on the photosensitive drum 102y. A magenta toner image is formed on the photosensitive drum 102m. A cyan toner image is formed on the photosensitive drum 102c. A black toner image is formed on the photosensitive drum 102k. Primary transfer devices 105y, 105m, 105c and 105k transfer each toner image formed on the photosensitive drums 102y, 102m, 102c and 102k onto an intermediate transfer belt 104. Thereby a mixed color image is formed on the intermediate transfer belt 104. The intermediate transfer belt 104 functions as an image carrier for carrying an image.

Accommodation units 110a and 110b contain sheets. Sheets in the accommodation units 110a and 110b are fed by sheet feed rollers, and conveyed to a registration roller 111 along a conveyance path. The registration roller 111 controls a conveyance timing of a sheet so that the timing of the arrival of the image on the intermediate transfer belt 104 at a secondary transfer unit 106 is the same as the timing of the arrival of a sheet at the secondary transfer unit 106. While the sheet and the image on the intermediate transfer belt 104 pass the secondary transfer unit 106, the toner image on the intermediate transfer belt 104 is transferred onto the sheet. After the toner image on the intermediate transfer belt 104 is transferred to the sheet, a residual toner on the intermediate transfer belt 104 is cleaned by a belt cleaner 108.

The sheet to which the image is transferred is conveyed to a fixing device 107. The fixing device 107 includes a plurality of rollers and heaters. The fixing device 107 fixes the toner image on the sheet by applying a heat and a pressure to the unfixed toner image on the sheet. The sheet to which the image is fixed by the fixing device 107 is outputted from the image forming apparatus 10 by a discharge roller 112.

When double-sided print mode execution for forming an image on both sides of a sheet is instructed via the operation unit 20, firstly a toner image is formed on a first side (front surface) of the sheet. The sheet, after passing through the fixing device 107, is guided to a reversing path 113 by a flapper. By being sent to the reversing path 113, the sheet whose conveyance direction is inverted is conveyed to a double-sided path 114. The sheet conveyed along with the double-sided path 114 is conveyed to the secondary transfer unit 106 by the registration roller 111 again. A toner image on the intermediate transfer belt 104 is transferred to a second side (back surface) of a sheet conveyed to the secondary transfer unit 106. The fixing device 107 fixes the toner image on the back surface of the sheet. The sheet is discharged to a discharge tray by the discharge roller 112. Thereby, images are formed on the both sides of a sheet. Aligning an image formation position on a front surface and an image formation position on a back surface is one kind of image quality relating to the double-sided print mode. Correction is performed for the back surface of the image formation position and the front surface of the image formation position measured using a measurement chart. Thereby, the image formation position of the front surface and the image formation position of the back surface are aligned.

<Control System>

Figure 2:
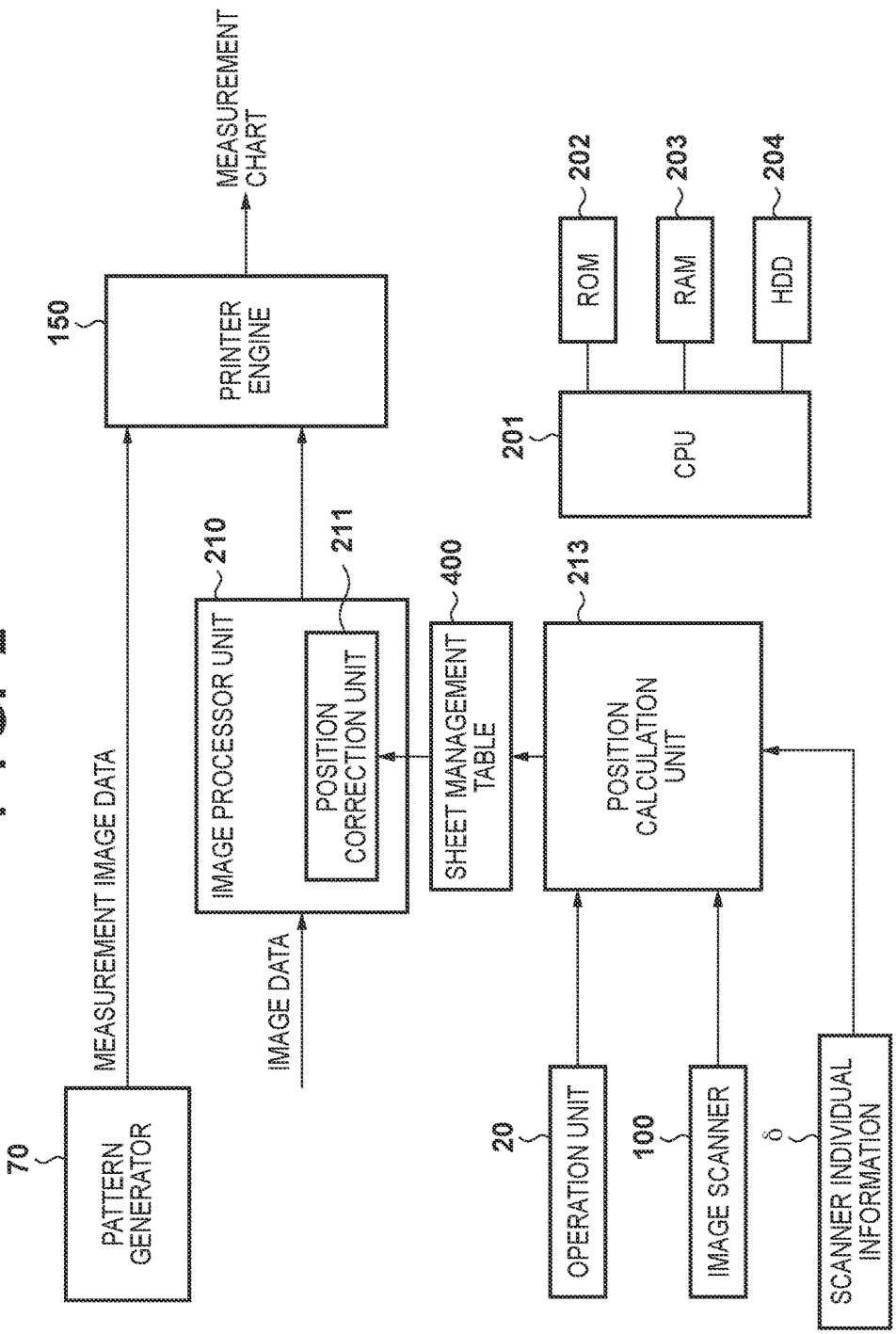
FIG. 2 is a block diagram illustrating a control system.

A control system of the image forming apparatus 10 is described using FIG. 2. A CPU 201 is a control circuit for controlling each unit. Control programs executed by the CPU 201 and required for executing each kind of processing in the later-described flowchart are stored in a ROM 202. A RAM 203 is a system work memory for operation of the CPU 201. An HDD 204 stores image data transferred from the image scanner 100 and a PC, setting information inputted via the operation unit 20, or the like. The printer engine 150 includes the image forming stations 101y, 101m, 101c, and 101k, the secondary transfer unit 106 and the fixing device 107.

The operation unit 20 is an example of a user interface. The operation unit 20 includes a display unit and an input unit. The operation unit 20 receives setting information or the like inputted by a user via the display unit or the input unit. Also, the operation unit 20 includes a function for providing information to the user via the display unit. The input unit includes, for example, a start key for instructing an execution initiation of a scan or a copy or the like, a stop key for instructing a stoppage of an operation of a scan or a copy or the like, a numeric keypad, or the like. In accordance with this embodiment, an instruction to create a correction condition for correcting an image formation position is also inputted via the operation unit 20.

An image processor unit 210 corrects image data so that a desired image is formed on a sheet by performing various image processing (for example, a tone correction or an image formation position correction) on the image data. The image processor unit 210 may be realized by hardware such as an ASIC (Application Specific Integrated Circuit) and may be realized by the CPU 201 executing a program. The image data to which the image processing is applied by the image processor unit 210 is transferred to the exposure unit 103. The exposure unit 103 is controlled based on the image data. The exposure unit 103 exposes the photosensitive drum 102 and based on the image data forms an electrostatic latent image on the photosensitive drum 102.

A position correction unit 211 is an example of a correction unit for correcting a formation position of an image on a sheet in accordance with a correction condition. The position correction unit 211 corrects image data so that the image formation position on the sheet becomes a target position. A known correction method may be employed for the correction method itself. It is possible that the formation position of an image formed on a sheet by the image forming apparatus 10 is not the ideal formation position. For example, in a case where the sheet conveyed by the registration roller 111 is tilted, the diagonally tilted sheet passes the secondary transfer unit 106. Therefore, the image on a sheet is printed at a tilt with respect to the sheet. In a case where a pressure distribution of a roller of the fixing device 107 is not uniform, the sheet after passing through the fixing device 107 is deformed and the image on the sheet tilts. An expansion or contraction of a sheet occurs due to the heat and the pressure of the fixing device 107 when the image is formed on the front surface of the sheet in a double-sided print, and therefore the size of the image formed on the front surface of the sheet differs from the size of the image formed on the back surface of the sheet (double-sided magnification error). In such a case, the formation position of an image printed on the front surface of the sheet differs from the formation position of an image printed on the back surface of the sheet. The tilt of a sheet passing through the secondary transfer unit 106 and the deformation amount of the sheet in the fixing device 107 caused by this has a high reproducibility if a size, a grammage and a material of sheets are same. Accordingly, the image forming apparatus 10 causes a deformation of the shape of an image that the image forming station 101 is caused to form in accordance with this deformation amount so that the formation position of an image with respect to the sheet becomes an ideal formation position. The position correction unit 211 transforms the image data based on a correction condition (for example, a transformation formula) for correcting a misalignment of the image formation position with respect to a sheet stored in a sheet management table 400. For example, in a case where a scaling factor in the main scanning direction is 1.1, the scaling factor in the main scanning direction of an image formed by the image forming apparatus 10 becomes 1.0 by the position correction unit 211 correcting the length of the main scanning direction of the image data to 1/1.1 in advance. Also, in a case where a coordinate of a pixel is misaligned in the rightward direction by 0.1 pixel, the pixel is formed at the ideal position by the position correction unit 211 shifting the coordinate of the pixel in the leftward direction by 0.1 pixel in advance. If the image forming station 101 forms an image based on the image data transformed by the position correction unit 211 in this way, an image that cancels the misalignment of the image formation position with respect to the sheet is formed on the intermediate transfer belt 104. Note that the sheet management table 400 stores for each type of sheet an amount of misalignment of a formation position and a correction condition for correcting the amount of misalignment generated by a position calculation unit 213. The sheet management table 400 may be stored in the HDD 204.

Figure 3:
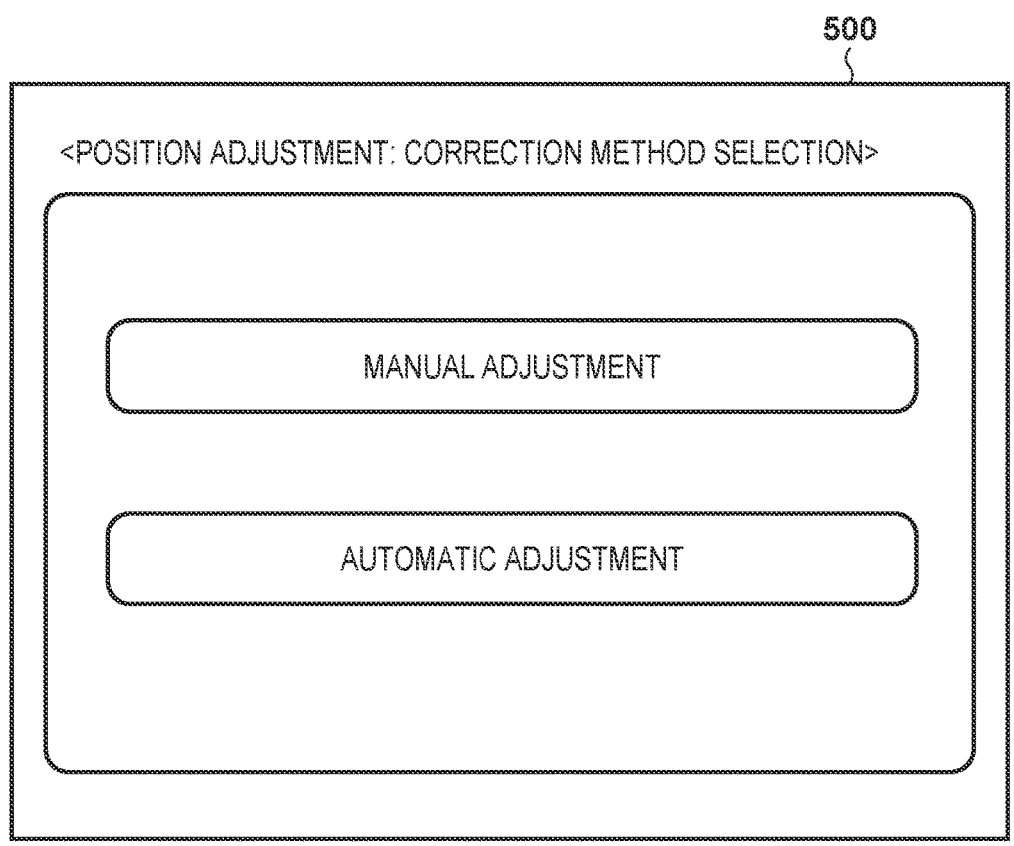
FIG. 3 is a view illustrating a correction mode selection interface.

The position calculation unit 213 executes misalignment amount measurement according to a manual mode and an automatic mode to measure an amount of misalignment of a formation position. As shown in FIG. 3, the CPU 201 displays a correction mode selection interface on the operation unit 20. The CPU 201 causes the position calculation unit 213 to create the correction condition in accordance with a correction mode selected via the operation unit 20. A pattern generator 70 transmits image data for forming the measurement chart to the printer engine 150. The printer engine 150 having received the image data creates the measurement chart by forming the measurement image on the sheet and outputs it. The measurement chart is a predetermined sheet on which a measurement image is formed in this way. In the manual mode, the user measures positions of the measurement image in the measurement chart and inputs them via the operation unit 20. In the automatic mode, the image scanner 100 reads the measurement image on the measurement chart, and transmits the read result to the position calculation unit 213. The position calculation unit 213 creates a correction condition from positions (coordinate data) of the measurement image, and causes the sheet management table 400 to store the correction condition.

The HDD 204 functions as a storage unit for storing a reduction condition (adjustment condition) for reducing a measurement error caused by an individual difference of the image scanner 100. Note that the measurement error caused by the individual difference of the image scanner 100 is inspected in advance, and the reduction condition stored in the HDD 204 is created in advance from the result of the inspection. The position calculation unit 213 functions as a reduction unit that, by applying the reduction condition to the result of measuring the measurement image by the image scanner 100, reduces the measurement error caused by an individual difference of the image scanner 100 included in the measurement result. Furthermore the position calculation unit 213 functions as a generation unit for generating a correction condition in accordance with a measurement result in a case where the measurement error is reduced.

Also, the position calculation unit 213 causes the image forming unit to form the measurement image on a sheet, obtains read data corresponding to a result of reading the measurement image by the reading unit, and generates a correction condition based on the read data and an adjustment condition. The adjustment condition is a condition for reducing a read error caused by an individual difference of the reading unit. Also, the position calculation unit 213 obtains first read data corresponding to the result of reading a first measurement image formed on a first face of a sheet by the reading unit, obtains second read data corresponding to the result of reading a second measurement image formed on a second face of the sheet by the reading unit, generates a first correction condition based on the first read data and an adjustment condition, and generates a second correction condition based on the second read data and the adjustment condition. The position correction unit 211 corrects a position where an image is formed on a first face of a sheet based on the first correction condition, and corrects the position where an image is formed on a second face of the sheet based on the second correction condition. Also a squareness of the image may be corrected by correcting the position.

The measurement image includes marks formed on (a plurality of) corners of a sheet. Note that a gap may be arranged between a mark and a corner (edge) of the sheet.

The position correction unit 211 and the position calculation unit 213 may be realized by a single controller or may be realized by different controllers. A controller is a control circuit including a plurality of logic circuits such as a CPU, an ASIC, or an FPGA. FPGA is the abbreviated name of Field-Programmable Gate Array.

(Sheet Management Table)

FIGS. 4A and 4B illustrate an example of the sheet management table 400 indicating data relating to sheets used for printing by the image forming apparatus 10. In sheets used in the image forming apparatus 10, there are sheets that are evaluated by a printer manufacturer that can be acquired on the market, for example, and sheets registered by a user via the operation unit 20. Attribute data for each type of sheet is registered in the sheet management table 400. A sheet name 511 is information for identifying sheets used for printing from each other. Additionally, data indicating for example a sub scanning direction sheet length 512, a main scanning direction sheet length 513, a grammage 514, and a surface property 515 is registered. For the surface property 515, for example, data indicating physical characteristics of a surface of a sheet such as normal paper, embossed, double-sided coating, and the like is registered. Generally, a coating processing is performed to improve glossiness. Embossing processing is processing for applying an unevenness on the surface of a sheet. A sheet color 516 is data for representing an under layer color of a sheet. A pre-print paper 517 is information for identifying whether or not a sheet used for printing is a pre-print paper. The pre-print paper is generally a sheet on which ruled lines, a frame or the like are printed.

The image forming apparatus 10 corrects a misalignment of the image formation position in relation to a sheet upon an execution of image formation so that an image is formed at an ideal formation position on the sheet. A position misalignment amount 520 in relation to a front surface of a sheet is information for representing the position misalignment amount from the ideal formation position on the front surface of the sheet. On the other hand, a position misalignment amount 521 in relation to a back surface of a sheet is information for representing the position misalignment amount from the ideal formation position on the back surface of the sheet. As position misalignment amounts 520 and 521, for example, there are formation position misalignment amounts in the sub scanning direction with respect to a sheet (hereinafter referred to as read position misalignment amounts). The read position is a print start position for an image in a case where an origin is set to a leading end in a conveyance direction of a sheet. Note that an initial value of the read position is zero. Also, as the position misalignment amounts 520 and 521, for example, there are position misalignment amounts in the main scanning direction with respect to a sheet (hereinafter referred to as side position misalignment amounts). A side position is a print start position for an image in a case where an origin is set to a left end of the sheet in a conveyance direction of a sheet. Note that an initial value of the side position is zero. Furthermore, as the position misalignment amounts 520 and 521, for example there are misalignment amounts of image length in the sub scanning direction (a scaling factor in relation to an ideal length) and a misalignment of image length in the main scanning direction (a scaling factor in relation to an ideal length). Note that initial values of the sub-scanning magnification and the main-scanning magnification are zero.

As described above, the image forming apparatus 10 has two modes—a manual mode and an automatic mode—as modes in which to create a correction condition. In the manual mode, the user measures a measurement chart using a scale or the like, and inputs the measurement result from a PC or the operation unit 20. The position calculation unit 213 calculates the position misalignment amounts 520 and 521 based on the inputted measurement results. In the automatic mode, the image scanner 100 reads a measurement chart and the position calculation unit 213 calculates the position misalignment amounts 520 and 521 based on a position of a measurement image in the measurement chart. In this way, the position calculation unit 213 newly registers the position misalignment amounts 520 and 521 in the sheet management table 400 as the sheet attribute information, or updates pre-registered attribute information.

<Measurement Chart>

Figure 5:
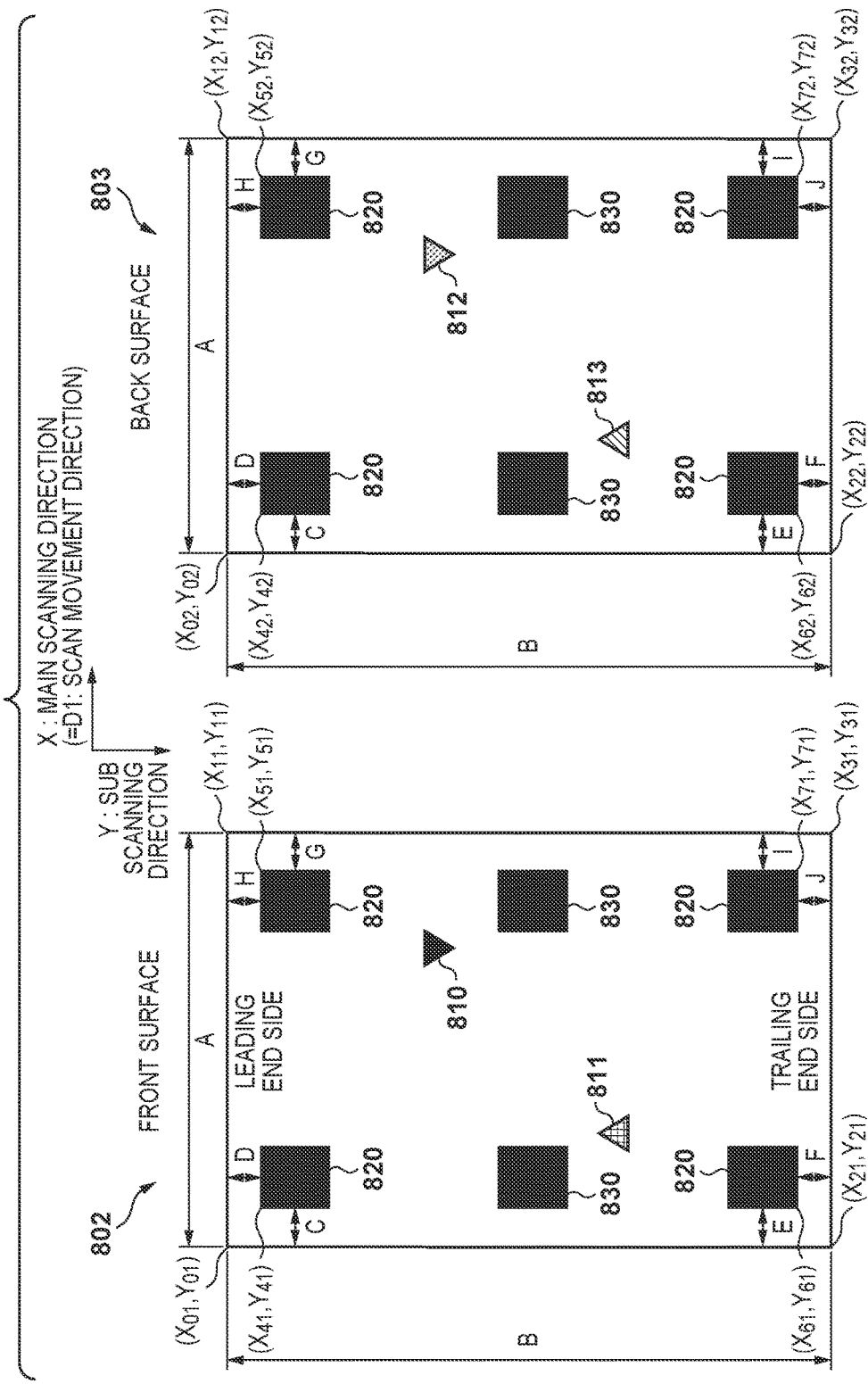
FIG. 5 is a view illustrating a measurement chart.

FIG. 5 illustrates an example of a measurement chart printed by the image forming apparatus 10 in the automatic mode. On a front surface 802 and a back surface 803 of the measurement chart a total of eight measurement images 820 are formed, for example. Note that the measurement images 820 are formed using toner of a color (example: black) for which there is a large difference in a degree of reflection in relation to an under layer of the sheet. Thereby, it becomes possible to detect at high precision the positions of the measurement images 820 in measurement chart read data according to the image scanner 100. The measurement images 820 are formed respectively at the four corners on both faces of the measurement chart. If the formation positions of the measurement images 820 are ideal formation positions, the measurement images 820 are formed at positions that are separated from the ends of the measurement chart sheet by a predetermined distance. In the manual mode, the position misalignment amounts 520 and 521 are obtained by the user measuring the distances from the ends of the sheet to the measurement images 820.

FIG. 6 illustrates a calculation table 600 in which conversion equations for obtaining position misalignment amounts from measurement results are registered. The calculation table 600 is stored in an internal storage apparatus of the position calculation unit 213 or in the HDD 204. In FIG. 6 illustrates each kind of position misalignment amount conversion equation for the back surface and the front surface of the sheet respectively. Here, in addition to the above described read position and side position and the like, a conversion equation related to a squareness is illustrated. Squareness is defined from distances D and H from the leading end of the sheet to measurement images, the sheet length in the main scanning direction, and the like. A correction condition is created so that a position misalignment amount obtained by such a conversion equation is cancelled. That is, the position misalignment amount is a parameter that defines a correction condition (transformation formula). In a wide sense a position misalignment amount itself is a correction condition.

In the automatic mode, the image scanner 100 may read the front surface of the measurement chart dividing into two times (a first half portion and a second half portion), and may read the back surface of the measurement chart dividing into two times (a first half portion and a second half portion). This is because it is necessary for the position calculation unit 213 to emphasize the end portions of the measurement chart on the original platen because the end portions of the measurement chart are detected by edge detection. For this emphasis, the measurement chart may be pressed to the original platen by a black pressure plate or the like. Also, the marks 810, 811, 812, and 813 which function as marks by which the user positions the measurement chart on the image scanner 100 may be formed on the measurement chart. For example, the color of the mark 810 is assumed to be blue, the color of the mark 811 to be yellow, the color of the mark 812 to be red, and the color of the mark 813 to be green. The user can understand the order in which the measurement charts on the image scanner 100 are caused to be read by the CPU 201 designating on the operation unit 20 the colors of the positioning marks in order. With this, it is possible to prevent duplicate reading.

In a first read operation, the image scanner 100 moves the carriage 40 from the home position P1 to the end position P2, and the image scanner 100 reads the first half portion (the leading end side half) of the front surface of the measurement chart. In a second read operation, the image scanner 100 moves the carriage 40 from the home position P1 to the end position P2, and the image scanner 100 reads the second half portion (the trailing end side half) of the front surface of the measurement chart. In a third read operation, the image scanner 100 moves the carriage 40 from the home position P1 to the end position P2, and the image scanner 100 reads the first half portion (the leading end side half) of the back surface of the measurement chart. In a fourth read operation, the image scanner 100 moves the carriage 40 from the home position P1 to the end position P2, and the image scanner 100 reads the second half portion (the trailing end side half) of the back surface of the measurement chart. The position calculation unit 213 combines read data of the first half portions and read data of the second half portions of the measurement chart to obtain the coordinates Pt01 (X01, Y01)-Pt71 (X71, Y71), and the coordinates Pt02 (X02, Y02)-Pt72 (X72, Y72) as illustrated in FIG. 5. The coordinate are denoted by $Pt_{ij}$ ($X_{ij}$, $Y_{ij}$), where i is an identification number indicating the position, and j is an identification number indicating the front surface ($j=1$) or the back surface ($j=2$). The coordinate Pt01 is a coordinate of the top-left corner on the front surface 802 of the measurement chart. The coordinate Pt11 is a coordinate of the top-right corner (vertex) on the front surface 802 of the measurement chart. The coordinate Pt21 is a coordinate of the bottom-left corner on the front surface 802 of the measurement chart. The coordinate Pt31 is a coordinate of the bottom-right corner on the front surface 802 of the measurement chart. The coordinate Pt41 is a coordinate of the top-left corner in the measurement image 820 formed in the top-left of the front surface 802. The coordinate Pt51 is a coordinate of the top-right corner in the measurement image 820 formed in the top-right of the front surface 802. The coordinate Pt61 is a coordinate of the bottom-left corner in the measurement image 820 formed in the bottom-left of the front surface 802. The coordinate Pt71 is a coordinate of the bottom-right corner in the measurement image 820 formed in the bottom-right of the front surface 802. The back surface 803 is defined similarly.

Marks 830 which are used to combine the read data of the first half portion and the read data of the second half portion in the measurement chart are formed. The marks 830 are formed twice on each of the front surface and the back surface of the measurement chart. The position calculation unit 213 combines the read data of the first half portions and the second half portions so that the coordinates of the center positions of the marks 830 in the read data of the first half portion matches the coordinates of the center positions of the marks 830 in the read data of the second half portion. Read data of one sheet (the measurement chart) is thus generated.

In the automatic mode, the position misalignment amount is measured from the result of reading the measurement chart by the image scanner 100. Therefore, because an individual difference of the image scanner 100 leads to an error in the read result, a reduction condition for reducing this read error becomes necessary. Because the image scanner 100 is not used in the manual mode, processing for reducing the individual difference of the image scanner 100 is unnecessary.

(Manual Mode)

Figure 7:
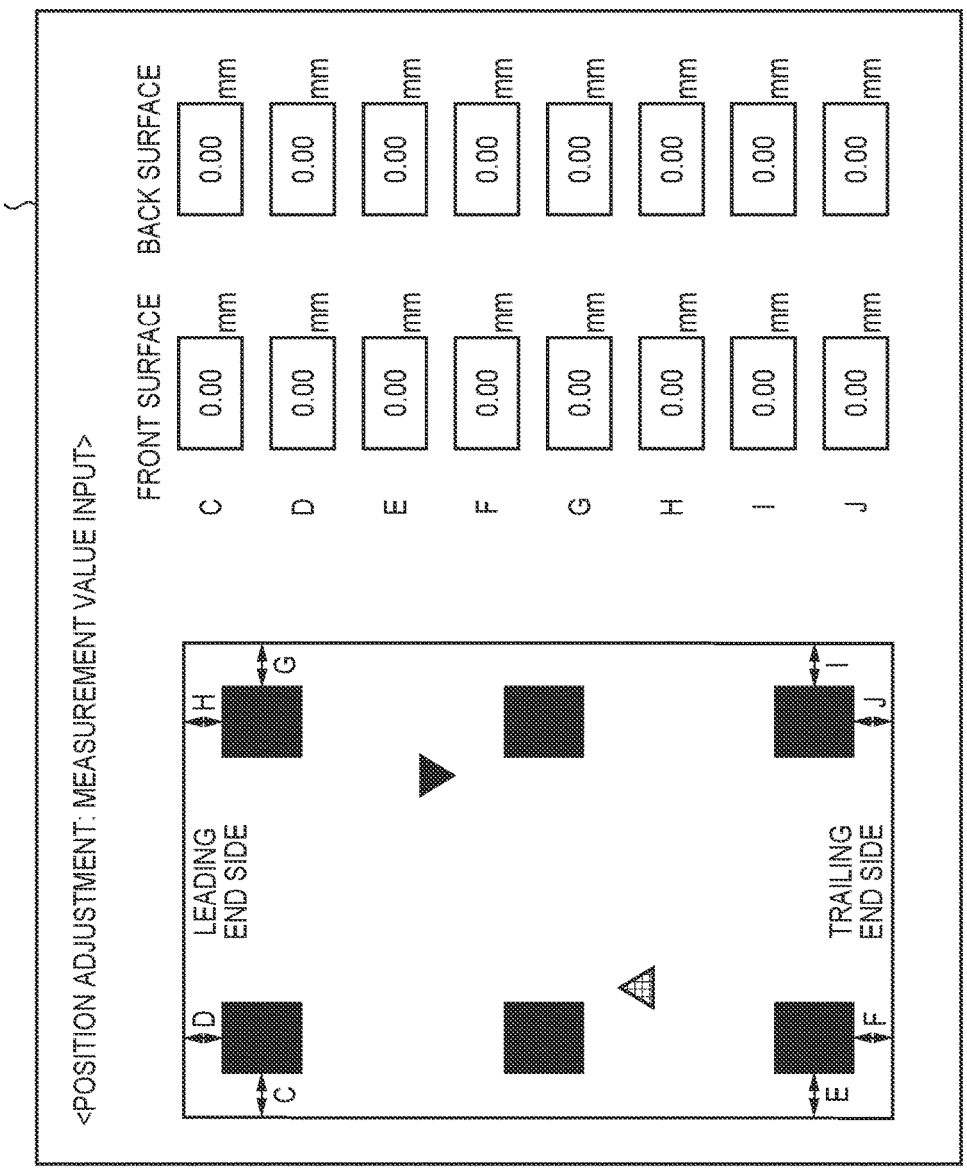
FIG. 7 is a view for illustrating a measurement value input interface in a manual mode.

A method of measuring a measurement chart in the manual mode using FIG. 5 and FIG. 7 is described. In the present embodiment, a measurement chart for the automatic mode and a measurement chart for the manual mode are described as being the same thing. Note that image data of separate measurement images suited to each mode from the perspective of ease of measurement may be stored in the pattern generator 70. In such a case, the pattern generator 70 outputs the image data for the manual mode when manual mode execution is instructed via the operation unit 20. Also, the pattern generator 70 outputs the image data for the automatic mode when automatic mode execution is instructed via the operation unit 20.

FIG. 7 is a user interface 700 for the manual mode that is displayed on the operation unit 20. Here, guidance indicating what portions of the measurement chart the user should measure and input boxes for inputting measurement results are arranged. In this example, parameters C-J are measured by the user for each of the front surface 802 and the back surface 803 of the measurement chart, and the measurement results are inputted using the operation unit 20. The position calculation unit 213 calculates a formation position misalignment amount based on information inputted from the operation unit 20. The calculations that the position calculation unit 213 executes are as illustrated in FIG. 6. As illustrated in FIG. 6, the position calculation unit 213 obtains "a read position", "a side position", "a main-scanning magnification", "a sub-scanning magnification", and a formation position misalignment amount by substituting the information inputted from the operation unit 20 into the arithmetic expressions registered in the calculation table 600. The calculation table 600 is stored in the HDD 204 or the like. The position calculation unit 213 registers misalignment amounts 520 and 521 of the calculated formation positions in the sheet management table 400 as sheet attribute information.

(Automatic Mode)

A computation method for the amount of misalignment of the formation position that the position calculation unit 213 executes in the automatic mode is described using FIG. 8 and FIG. 9. Processing for reducing an individual difference of the image scanner 100 is also described. FIG. 8 is a view illustrating a squareness read error that occurs due to an individual difference of the image scanner 100. The image forming apparatus 10 outputs a measurement chart on which measurement images are formed on both faces by executing double-sided printing. A front surface 802a illustrates the front surface of the measurement chart that is actually outputted. A back surface 803a illustrates the back surface of the measurement chart that is actually outputted. In this example, the measurement chart is assumed to be formed with correct squareness.

As described above, when there is a flatness misalignment of the rail 41 in the image scanner 100, a frame distortion of the image scanner 100, or an error in the distance (focal point) from the carriage 40 to the read surface, then an error will occur in the squareness. According to FIG. 8, a squareness misalignment $\delta$ occurs in the image of a front surface 802b of the measurement chart obtained by the image scanner 100. The squareness misalignment $\delta$ is a specific read error in each individual, and is also error data. Similarly, a squareness misalignment $\delta$ occurs in the image of a back surface 803 of the measurement chart obtained by the image scanner 100. The squareness misalignment $\delta$ is individual information that occurs due to a part tolerance and an assembly process of the image scanner 100, and is stored in the HDD 204 at the manufacturing stage for the image scanner 100. Note that the squareness misalignment $\delta$ has distance units. The squareness misalignment $\delta$ is a distance between a straight line L2 that is orthogonal to a straight line L1, which connects a bottom-right corner in the top-left measurement image 820 and a top-right corner in the bottom-left measurement image 820, and a bottom-left corner in the top-right measurement image 820. The definition of the squareness misalignment $\delta$ may be different from this. The squareness misalignment $\delta$ may also be a distance between a straight line L2 that is orthogonal to a straight line, which connects a top-left corner in the top-left measurement image 820 and a bottom-left corner in the bottom-left measurement image 820, and a top-right corner in the top-right measurement image 820.

FIG. 9A through FIG. 9H are views illustrating details of correction of the formation position with respect to the sheet. The measurement charts illustrated FIG. 9A through FIG. 9H are measurement charts input as images by the image scanner 100. The position calculation unit 213 executes edge detection on image data that the image scanner 100 obtained by reading the measurement chart. Thereby the position calculation unit 213 obtains a position of the end portions of the sheet and the respective positions of the measurement images 820. Here, a front surface 802 of the measurement chart is described, but similar processing is applied to the back surface 803. The position calculation unit 213 connects the coordinates (xp1, yp1) of the top-left corner and (xp2, yp2) of the top-right corner of the measurement chart in a straight line. Also, the position calculation unit 213 connects the coordinates (xp1, yp1) of the top-left corner and the coordinates (xp3, yp3) of the bottom-left corner of the measurement chart in a straight line. The position calculation unit 213 connects the coordinates (xp2, yp2) of the top-right corner and the coordinates (xp4, yp4) of the bottom-right corner of the measurement chart in a straight line. The position calculation unit 213 connects the coordinates (xp3, yp3) of the bottom-left corner and the coordinates (xp4, yp4) of the bottom-right corner of the measurement chart in a straight line. Furthermore, the position calculation unit 213 connects the coordinates (x11, y11) of the top-left corner of the measurement image formed in the top-left and the coordinates (x12, y12) of the top-right corner of the measurement image formed in the top-right in a straight line. The position calculation unit 213 connects the coordinates (x11, y11) of the top-left corner of the measurement image formed in the top-left and the coordinates (x13, y13) of the bottom-left corner of the measurement image formed in the bottom-left in a straight line. The position calculation unit 213 connects the coordinates (x13, y13) of the bottom-left corner of the measurement image formed in the bottom-left and the coordinates (x14, y14) of the bottom-right corner of the measurement image formed in the bottom-right in a straight line. The position calculation unit 213 connects the coordinates (x12, y12) of the top-right corner of the measurement image formed in the top-right and the coordinates (x14, y14) of the bottom-right corner of the measurement image formed in the bottom-right in a straight line. Here, connecting in a straight line means obtaining an equation for a straight line that passes through two points.

The position calculation unit 213 decides a transformation formula 1 for correcting image data so that the straight line that connects the coordinates (x11, y11) and the coordinates (x12, y12) becomes at right angles with respect to the straight line connecting the coordinates (x11, y11) and the coordinates (x13, y13). Here, as illustrated in FIG. 9B, a position of a length that is half the length of the straight line connecting the coordinates (x11, y11) and the coordinates (x12, y12) becomes a reference. The transformation formula 1 is an arithmetic expression for correcting the write start position in the sub scanning direction of the image for each position in the main scanning direction. A squareness correction amount d obtained by this transformation formula 1 corresponds to a right angle correction condition. The squareness correction amount d is calculated based on the following logic. The position calculation unit 213 calculates a right angle ideal point PD (xpd, ypd) from the coordinates (x11, y11), the coordinates (x12, y12), the coordinates (x13, y13), and the coordinates (x14, y14). For example, the position calculation unit 213 decides a first straight line that connects the measurement image formed in the top-left corner of the sheet and the measurement image formed in the bottom-left corner of the sheet. Furthermore, the position calculation unit 213 decides a second straight line that passes through the measurement image formed in the top-left corner of the sheet and is orthogonal with the first straight line. The position calculation unit 213 decides a third straight line that connects the measurement image formed in the bottom-right corner of the sheet and the measurement image formed in the top-right corner of the sheet. The position calculation unit 213 decides the intersection point between the second straight line and the third straight line to be the right angle ideal point PD. The position calculation unit 213 calculates a rectilinear distance (=the read squareness δt) from the right angle ideal point PD to the coordinates (x12, y12). The right angle ideal point PD (xpd, ypd) is obtained as follows using the slope a0 of the straight line connecting the coordinates (x11, y11) and the coordinates (x13, y13).

$$xpd = x11 + (x12 - x11) \quad (1)$$

$$ypd = -xpd/a0 + b \quad (2)$$

$$a0 = (y11 - y13)/(x11 - x13) \quad (3)$$

Here, b is the y intercept of the straight line with a slope of −1/a0 that passes through the coordinates (x11, y11). The read squareness δt is obtained by the following formula because it is the distance between the right angle ideal point PD (xpd, ypd) and the coordinates (x12, y12).

$$\delta t = \mathrm{sqrt}((x12-xpd)^2 + (y12-ypd)^2) \quad (4)$$

Here the function sqrt( ) is a function for obtaining a square root. The operation symbol "^" is a symbol meaning raising to the power of.

Here the read squareness δt is a value that includes the squareness misalignment δ due to an individual difference of the image scanner 100. For this reason, the position calculation unit 213 obtains the squareness correction amount d using the squareness misalignment δ due to the individual difference and the read squareness St.

$$d = \delta t + \delta \quad (5)$$

Here d, δt, and δ are index values indicating tilts respectively corresponding to 1 mm, and therefore they are stored in the HDD 204 as parameters for which simple addition is possible. Note that the squareness correction amount d may be held in the sheet management table 400. Note that the squareness correction amount d may be referred to as a first right angle correction condition. δ is a measurement error due to an individual difference of the image scanner 100 (read error data). The squareness correction amount d is a reduction condition created to reduce this measurement error from the result of measuring the measurement image by the image scanner 100.

x11 moves along the straight line (y=a0x+b0) connecting (x11, y11) and (x13, y13). x12 moves along the straight line (y=a1x+b1) connecting (x11, y11) and (x12, y12). As FIG. 9A illustrates, when a case in which the slope a1 of the straight line connecting (x11, y11) and (x12, y12) is a negative slope is described, the coordinates (x11, y11) and the coordinates (x12, y12) move as follows.

$$x21 = x11 - 0.5d \times \cos(\theta 0) \quad (6)$$

$$y21 = y11 - 0.5d \times \sin(\theta 0) \quad (7)$$

$$x22 = x12 + 0.5d \times \cos(\theta 1) \quad (8)$$

$$y22 = y12 + 0.5d \times \sin(\theta 1) \quad (9)$$

Note that θ1 is arctan(a1). If the slope a1 is a positive slope, the position calculation unit 213 decides new coordinates (x21, y21) and (x22, y22) based on the following equations.

$$x21 = x11 + 0.5d \times \cos(\theta 0) \quad (10)$$

$$y21 = y11 + 0.5d \times \sin(\theta 0) \quad (11)$$

$$x22 = x12 - 0.5d \times \cos(\theta 1) \quad (12)$$

$$y22 = y12 - 0.5d \times \sin(\theta 1) \quad (13)$$

Similarly, the coordinates (x13, y13) and the coordinates (x14, y14) are respectively corrected to the coordinates (x23, y23) and (x24, y24) based on the squareness correction amount d. If the slope a1 is negative, the following equations are applied.

$$x23=x13-0.5d\times\cos(\theta 0) \quad (14)$$

$$y23=y13-0.5d\times\sin(\theta 0) \quad (15)$$

$$x24=x14+0.5d\times\cos(\theta 1) \quad (16)$$

$$y24=y14+0.5d\times\sin(\theta 1) \quad (17)$$

If the slope a1 is positive, the following equations are applied.

$$x23=x13+0.5d\times\cos(\theta 0) \quad (18)$$

$$y23=y13+0.5d\times\sin(\theta 0) \quad (19)$$

$$x24=x14-0.5d\times\cos(\theta 1) \quad (20)$$

$$y24=y14-0.5d\times\sin(\theta 1) \quad (21)$$

Where θ0 and θ1 are defined as follows.
θ0=a tan(a0), θ1=a tan(a1)

In this way, an influence of the squareness misalignment value δ specific to the image scanner 100 is reduced from the results of reading the measurement chart for both the front surface and the back surface. Also, the squareness of the image that the image forming apparatus 10 outputted becomes correct (that is, the squareness approaches zero) because the image data is corrected using a read result corrected using the squareness misalignment value δ.

Note that Equation (6) through Equation (21) are equations for transforming the coordinates of the four corners of the image, but this may be extended to a transformation formula for any points in the image. Here, an arbitrary point (x1m, y1m) on the straight line connecting the coordinates (x11, y11) and the coordinates (x12, y12) is described. A movement direction of the arbitrary point (x1m, y1m) is the same as a movement direction of the coordinates (x11, y11) or the coordinates (x12, y12). Also, the movement distance is proportional to a distance from the midpoint of the coordinates (x11, y11) and the coordinates (x12, y12) to the point (x1m, y1m). Accordingly, new coordinates (x2m, y2m) of (x1m, y1m) are decided by the following equations. If the slope a1 is negative, and the point (x1m, y1m) is closer to the coordinates (x11, y11) than to the midpoint, the following equations are applied.

$$x2m=x1m-0.5d\times\alpha\times\cos(\theta 0) \quad (22)$$

$$y2m=y1m-0.5d\times\alpha\times\sin(\theta 0) \quad (23)$$

If the slope a1 is negative, and the point (x1m, y1m) is closer to the coordinates (x12, y12) than to the midpoint, the following equations are applied.

$$x2m=x1m+0.5d\times\alpha\times\cos(\theta 1) \quad (24)$$

$$y2m=y1m+0.5d\times\alpha\times\sin(\theta 1) \quad (25)$$

If the slope a1 is positive, and the point (x1m, y1m) is closer to the coordinates (x11, y11) than to the midpoint, Equation (24) and Equation (25) are applied. Meanwhile, if the slope a1 is positive, and the point (x1m, y1m) is closer to the coordinates (x12, y12) than to the midpoint, Equation (22) and Equation (23) are applied.

Where the coefficient α is defined by the following formula.

$$\alpha=Lm/L1 \quad (26)$$

L1 is a distance from the midpoint of the coordinates (x11, y11) and the coordinates (x12, y12) to the coordinates (x11, y11). Lm is a distance from the midpoint of the coordinates (x11, y11) and the coordinates (x12, y12) to the point (x1m, y1m). An arbitrary point (x1n, y1n) not on the straight line connecting the coordinates (x11, y11) and the coordinates (x12, y12) is transformed into the point (x2n, y2n). For example, the point (x2n, y2n) is obtained by setting an intersection point between a straight line of slope a0 that passes through the midpoint of the coordinates (x11, y11) and the coordinates (x12, y12) and a straight line of slope a1 that passes through the point (x1n, y1n) as a reference, and moving by a similar method to the point (x1m, y1m).

The position calculation unit 213 decides a transformation formula 2 for correcting image data so that the straight line connecting the coordinates (x23, y23) and the coordinates (x24, y24) of the trailing end in the conveyance direction of the sheet becomes at right angles with respect to the straight line connecting the coordinates (x21, y21) and the coordinates (x23, y23). As FIG. 9C illustrates, the position (x102, y102) of half the length of the line segment connecting the coordinates (x23, y23) and the coordinates (x24, y24) becomes a reference. The transformation formula 2 is an arithmetic expression for correcting the scaling factor in the sub scanning direction for each position in the main scanning direction. This transformation formula 2 corresponds to a second right angle correction condition. As FIG. 9D illustrates, the position calculation unit 213 corrects the coordinates (x23, y23) to the coordinates (x33, y33) based on the second right angle correction condition, and corrects the coordinates (x24, y24) to the coordinates (x34, y34).

The position calculation unit 213 decides a transformation formula 3 for correcting image data so that the image length in the main scanning direction becomes an ideal length, and the image length in the sub scanning direction becomes an ideal length. Here, as illustrated in FIG. 9E, the top-left corner of the image becomes a reference. The transformation formula 3 is an arithmetic expression for correcting the scaling factor of the image in the main scanning direction and correcting the scaling factor of the image in the sub scanning direction. This transformation formula 3 corresponds to a scaling correction condition. The position calculation unit 213 corrects the coordinates (x21, y21) to (x41, y41) based on a scaling correction condition. Note that if the top-left corner of the image becomes the reference, x21=x41 and y21=y41. The position calculation unit 213 corrects the coordinates (x22, y22) to (x42, y42), corrects the coordinates (x33, y33) to (x43, y43), and corrects the coordinates (x34, y34) to (x44, y44) based on the scaling correction condition.

The position calculation unit 213, as illustrated in FIG. 9F, corrects the image data so that the left end of the sheet and the left end of the image become parallel. The left end of the sheet is the line segment connecting the coordinates (xp1, yp1) of the top-left of the measurement chart and the coordinates (xp3, yp3) of the bottom-left of the measurement chart. The left end of the image is a line segment connecting the coordinates (x41, y41) of the top-left corner of the image and the coordinates (x43, y43) of the bottom-left corner of the image. The position calculation unit 213 decides the transformation formula 4 for correcting the image data to rotate the image by an angle θ2 centered at the top-left corner of the image. A transformation formula 4 is an arithmetic expression for causing the image to rotate by the angle θ2. This transformation formula 4 corresponds to a rotational correction condition. As FIG. 9F and FIG. 9G illustrate, the position calculation unit 213, based on the rotational correction condition, transforms the coordinates (x42, y42) to the coordinates (x52, y52), transforms the coordinates (x43, y43) to the coordinates (x53, y53), and transforms the coordinates (x44, y44) to (x54, y54).

As FIG. 9G illustrates, the center position of the sheet and the center position of the image are misaligned. For this reason, the position calculation unit 213 decides a transformation formula 5 for correcting the write start position of the main scanning direction and the write start position of the sub scanning direction so that these match. Note that the position calculation unit 213 obtains the center position of the sheet from the coordinates (xp1, yp1) through (xp4, yp4) of the four corners of the measurement chart. The transformation formula 5 is an arithmetic expression for correcting the write start position in the main scanning direction and the write start position in the sub scanning direction. This transformation formula 5 corresponds to an offset condition. The formation position of an image transformed based on the offset condition becomes the ideal formation position as FIG. 9H illustrates.

In this way, the misalignment of the formation position is adjusted by causing the actual image that is to be printed to the sheet to shift a pre-determined amount and causing it to rotate based on lengths from the sheet ends to the measurement images 820. If the manual mode is executed, the position calculation unit 213 decides the transformation formulas 1 through 5 based on the information regarding the front surface inputted from the operation unit 20. On the other hand, if the automatic mode is executed, the position calculation unit 213 decides the transformation formulas 1 through 5 based on the read result of the front surface of the measurement chart by the image scanner 100. Here, the transformation formulas 1 through 5 for the front surface correspond to correction conditions for the first side of the sheet. The transformation formulas 1 through 5 for the front surface decided by the position calculation unit 213 are stored in the sheet management table 400. The transformation formulas 1 through 5 may be unified into one transformation formula. Regarding the back surface of the sheet, the position of the image is corrected with respect to the sheet similarly. If the automatic mode is executed, the position calculation unit 213 decides the transformation formulas 1 through 5 based on the read result of the back surface of the measurement chart by the image scanner 100. Here, the transformation formulas 1 through 5 for the back surface correspond to correction conditions for the second side of the sheet. The transformation formulas 1 through 5 for the back surface decided by the position calculation unit 213 are stored in the sheet management table 400.

If the image forming apparatus 10 forms an image on a sheet based on image data, the position correction unit 211 transforms the image data based on the transformation formulas 1 through 5 read out from the sheet management table 400. By this, a misalignment of the formation position is corrected so that the formation position of an image with respect to the sheet becomes an ideal position.

(Automatic Mode Flow)

Figure 10:
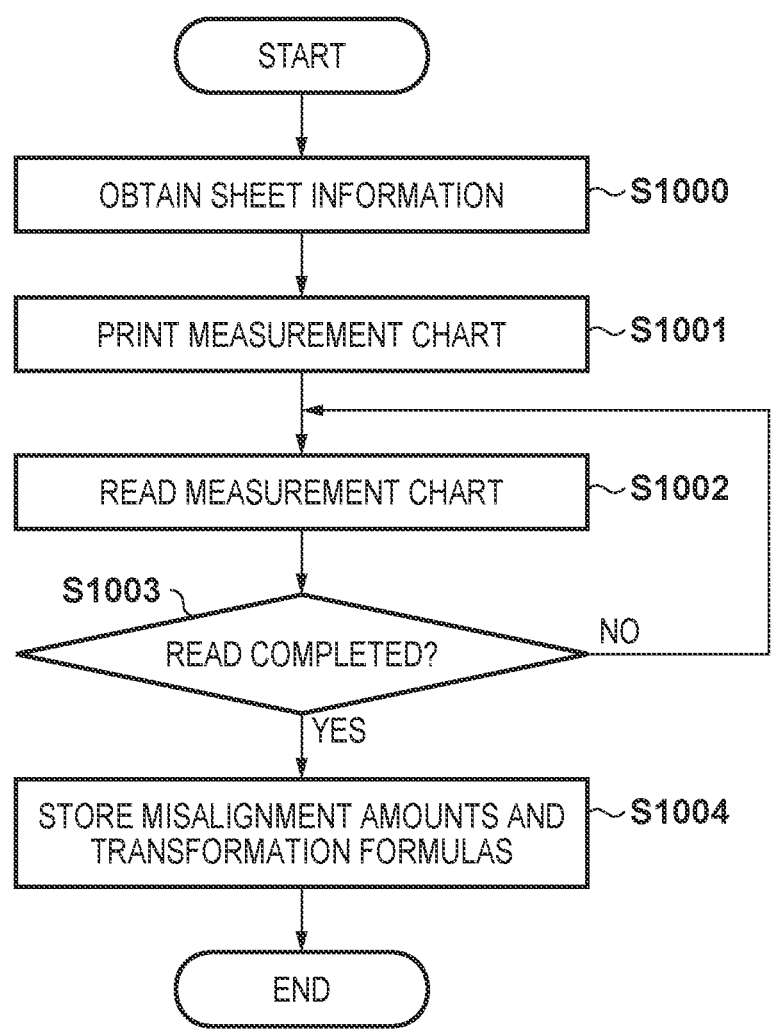
FIG. 10 is a flowchart for illustrating correction condition generation processing in an automatic mode.

Using FIG. 10, a flow of processing in the automatic mode is described. In step S1000, the CPU 201 obtains information identifying the type of the sheet through the operation unit 20. In step S1001, the CPU 201 causes the pattern generator 70 to output image data for the measurement chart, and causes the printer engine 150 to create the measurement chart. In step S1002, the CPU 201 controls the image scanner 100 to read the measurement chart. In step S1003, the CPU 201 determines whether or not reading of the measurement chart is complete. For example, if n measurement charts are created, the CPU 201 determines whether or not the number of measurement charts read in by the image scanner 100 matches n. If measurement images are formed on both sides of the sheet, the CPU 201 determines whether or not the number of reads by the image scanner 100 matches 2n. If each surface is read dividing into two times, the CPU 201 determines whether or not the number of reads by the image scanner 100 matches 4n. If reading of the measurement charts is not complete, the CPU 201 causes the image scanner 100 to read the next measurement chart. If reading of the measurement charts is complete, the CPU 201 advances to step S1004. In step S1004, the CPU 201 calculates the position misalignment amounts of the image with respect to the sheet based on the measurement chart read results. Furthermore, the CPU 201 obtains the above described transformation formulas and stores them in the sheet management table 400. That is, the CPU 201 stores the correction conditions (the misalignment amounts, the transformation formulas, etc.) in association with the type of sheet inputted from the operation unit 20 to the sheet management table 400.

Figure 11:
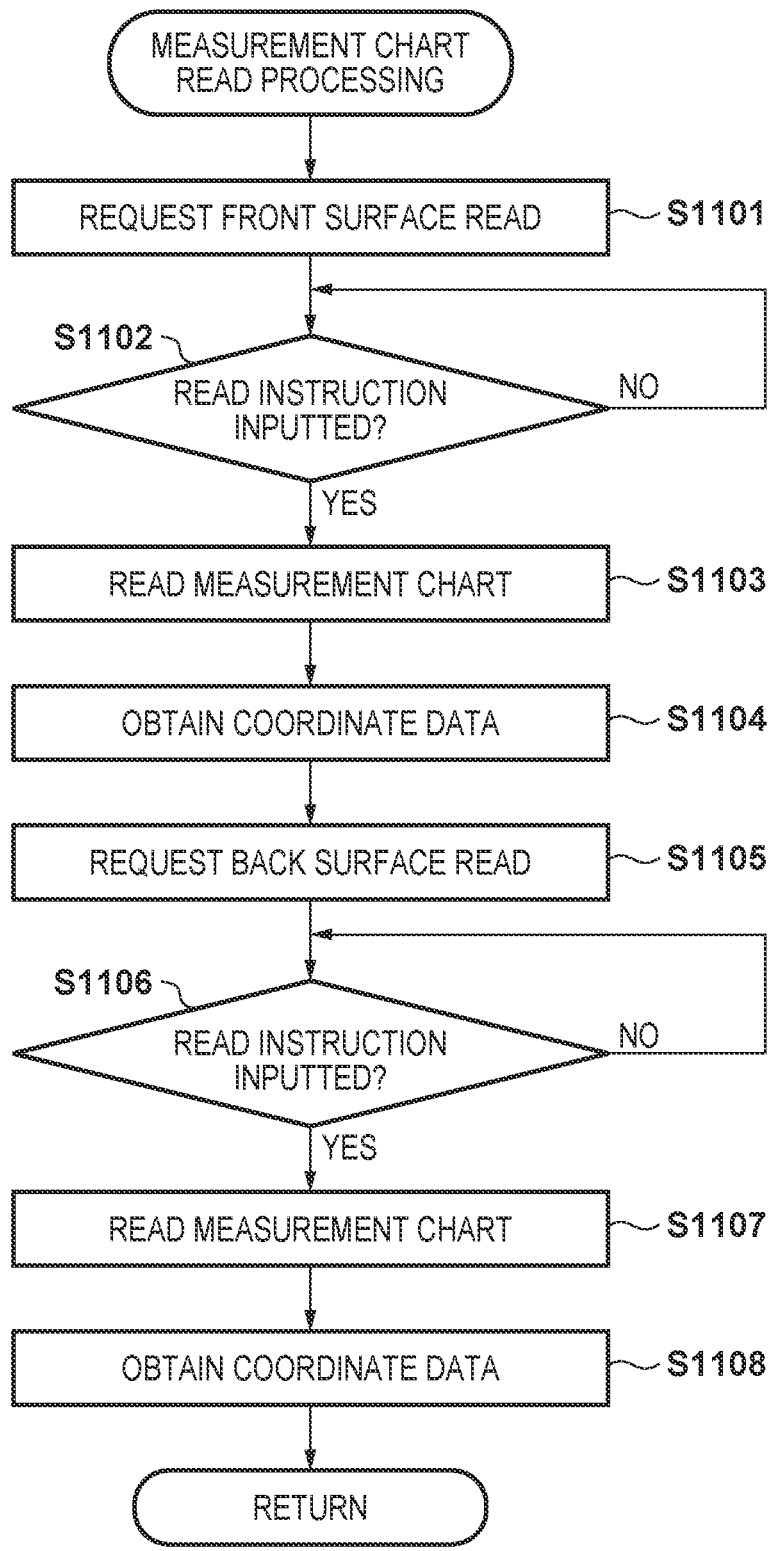
FIG. 11 is a flowchart for illustrating measurement chart read processing.

Using FIG. 11, measurement chart read processing is described. This read processing corresponds to the above described step S1002. In step S1101, the CPU 201 prompts the user for a read operation of the front surface 802 of the measurement chart. For example, the CPU 201 displays a read prompt and a guidance to the operation unit 20. The user places the measurement chart on the original platen of the image scanner 100 so that the front surface 802 is down, and presses a read start button. In step S1102, the CPU 201 determines whether or not a read instruction is inputted through the operation unit 20. A read instruction means pressing the read start button. When the read instruction is inputted, the CPU 201 advances to step S1103. In step S1103, the CPU 201 controls the image scanner 100 to read the front surface 802 of the measurement chart. In step S1104, the CPU 201 obtains coordinate data for the front surface 802 of the measurement chart from the result of reading of the measurement chart. In the coordinate data, data such as the coordinates (x11, y11), (x12, y12), (x13, y13), and (x14, y14) as illustrated in FIG. 9A are included. Note that if correction described in regards to FIG. 9F through FIG. 9H is executed, the coordinates of the four corners of the measurement chart are obtained in the result of reading. This is necessary to obtain the left side of the measurement chart and the center position in the result of reading.

In step S1105, the CPU 201 prompts the user for a read operation of the back surface 803 of the measurement chart. For example, the CPU 201 displays a read prompt and a guidance to the operation unit 20. The user places the measurement chart on a pressing plate of the image scanner 100 so that the back surface 803 is down, and presses a read start button. In step S1106, the CPU 201 determines whether or not a read instruction is inputted through the operation unit 20. When the read instruction is inputted, the CPU 201 advances to step S1107. In step S1107, the CPU 201 controls the image scanner 100 to read the back surface 803 of the measurement chart. In step S1108, the CPU 201 obtains coordinate data for the back surface 803 of the measurement chart from the result of reading of the measurement chart.

(Correction Flow in Normal Print Sequence)

Figure 12:
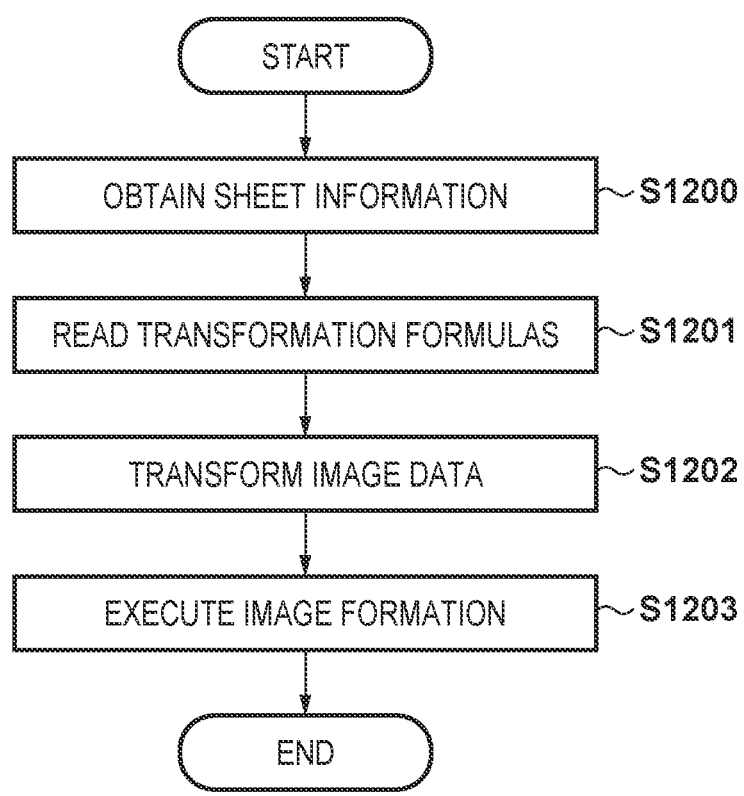
FIG. 12 is a flowchart for illustrating an image formation position correction method.

Using FIG. 12, a position misalignment correction flow is described in the normal print sequence. A normal print sequence means that the image forming apparatus 10 prints an image of an original read in by the image scanner 100, or the image forming apparatus 10 forms an image on a sheet based on image data transferred from a PC (not shown). In step S1200, the CPU 201 obtains information identifying the type of sheet inputted through the operation unit 20 or the like. In step S1201, the CPU 201 reads the transformation formulas corresponding to the type of the sheet designated through the operation unit 20 or the like from the sheet management table 400. The transformation formulas as described above are transformation formulas for correcting misalignment amounts of the formation position obtained using the measurement chart. In the present embodiment, as described above, because the respective measurement chart read results are corrected based on the squareness correction amount d, the precision of the transformation formulas increases. In step S1202, the CPU 201 transforms the image data. For example, the CPU 201 sets a transformation formula for the position correction unit 211 and causes the position correction unit 211 to transform the image data. As described above, by applying a transformation formula, the shape of the image that the image data represents is deformed in advance. This deformation is a deformation that cancels the deformation that occurs in the printer engine 150. In step S1203, the CPU 201 executes image formation. For example, the CPU 201 controls the printer engine 150 to cause an image to be formed on the front surface of the sheet based on the image data outputted from the image processor unit 210.

Note that if a double-sided print mode is selected through the operation unit 20, the CPU 201 controls a flapper to cause the sheet that passed through the fixing device 107 to be conveyed to the reversing path 113. Then after the conveyance direction of the sheet is inverted in the reversing path 113, an image is formed on the back surface of the sheet based on the image data outputted from the image processor unit 210. For the image of the back surface as well, the CPU 201 reads the transformation formulas for the back surface from the sheet management table 400, and applies the transformation formulas to the image data for the back surface. Thereby, the formation position of the image of the front surface of the sheet and the formation position of the image of the back surface are respectively corrected to ideal positions.

(Effect)

By virtue of this embodiment, a measurement chart read error that occurs due to a squareness misalignment δ specific to the image scanner 100 is reduced. That is, it becomes possible to correctly measure the squareness misalignment δt of a measurement chart that occurs due to the printer engine 150. As a consequence, transformation formulas can be created that can more correctly correct the formation position of an image. For example, by creating the front surface and the back surface by separate transformation formulas, correcting the image data using these transformation formulas and executing double-sided printing, the image formation positions for the front and back of the sheet are corrected at good precision. Also, the squareness of the images is corrected correctly by this. That is, it becomes possible for the squareness of the front surface and the squareness of the back surface to both approach zero.

The image forming apparatus 10 illustrated in FIG. 1 integrates the image scanner 100. However the present invention can be applied to an image forming apparatus to which the reading apparatus can be connected. In such a case, the image forming apparatus 10, for example, has an interface capable of obtaining information of the reading apparatus, and obtains the individual difference information δ of the reading apparatus via the interface. The CPU 201 decides the squareness correction amount d based on the individual difference information δ and the result δt for which the reading apparatus read the measurement chart.

The user must cause the image scanner 100 to read the measurement chart printed by the image forming apparatus 10. Accordingly, a reading device that functions as the image scanner 100 may be arranged in a conveyance path of the image forming apparatus 10. The reading device is arranged in a conveyance path downstream of the fixing device 107 in a conveyance direction in which sheets are conveyed. The reading device may be arranged between the fixing device 107 and the discharge roller 112. The reading device may be arranged in the reversing path 113. If the reading device is arranged in the reversing path 113, the CPU 201 forms a measurement chart on the front surface of the sheet, and after causing the reversing path 113 to convey the measurement chart, causes the reading device to read the measurement chart formed on the front surface of the sheet. Then, after causing the conveyance direction of the measurement chart to be inverted, the measurement chart is caused to be conveyed to the secondary transfer unit 106. Here, because the front and back of the sheet are inverted, the CPU 201 forms a measurement chart on the back surface of the sheet. Then, the CPU 201 causes the reading device to read the measurement chart formed on the back surface of the sheet after causing the measurement chart which passed through the secondary transfer unit 106 to once again be conveyed to the reversing path 113. After the reading device reads the measurement chart formed on the back surface of the sheet, the CPU 201, after causing inversion of the conveyance direction of the measurement chart, causes the measurement chart to be conveyed to the secondary transfer unit 106, causes it to be conveyed to the fixing device 107, and causes the discharge roller 112 to discharge the measurement chart. Note that the CPU 201, similarly to the case where it reads the measurement chart by the image scanner 100, decides the squareness correction amount d based on the individual difference information δ and the result δt for which the reading device read the measurement chart. By virtue of this configuration, a user does not need to cause the image scanner 100 to read the measurement chart, and so usability improves.

CONCLUSION

By virtue of this embodiment, a measurement error (squareness misalignment δ) due to an individual difference of the image scanner 100 is obtained at a time of manufacture of the image scanner 100, and is held in a storage unit such as the HDD 204. Also, a squareness correction amount d is obtained by adding the squareness misalignment δ caused by an individual difference to the squareness misalignment δt that occurs due to the printer engine 150 in the read result of the image scanner 100. Thus, the squareness correction amount d is an example of a reduction condition created to reduce this measurement error from the result of measuring the measurement image by the image scanner 100. The position calculation unit 213, by applying the reduction condition to the result of measuring the measurement image by the image scanner 100, reduces the measurement error caused by an individual difference of the image scanner 100 included in the measurement result. The position calculation unit 213 generates a correction condition (position misalignment amounts, transformation formulas) in accordance with this measurement result in which the measurement error is reduced. The position correction unit 211 corrects a formation position of an image on a sheet in accordance with a correction condition. Because the influence that an individual difference present in the image scanner 100 exerts on a read result of the measurement image which is a reference image is reduced in this way, the image formation position correction precision is improved.

The image formation positions of both sides of the sheet may be corrected as described above. The image scanner 100 measures a measurement image formed on the first side of the sheet, and measures a measurement image formed on the second side of the sheet. The position calculation unit 213, by applying the reduction condition to the result of measuring the measurement image formed on the first side, reduces the measurement error caused by an individual difference of the image scanner 100 included in the measurement result. Furthermore, the position calculation unit 213 generates a first correction condition for correcting the formation position of the image formed on the first side in accordance with measurement result in which the measurement error is reduced. Similarly, the position calculation unit 213, by applying the reduction condition to the result of measuring the measurement image formed on the second side, reduces the measurement error caused by an individual difference of the image scanner 100 included in the measurement result. The position calculation unit 213 generates a second correction condition for correcting the formation position of the image formed on the second side in accordance with measurement result in which the measurement error is reduced. The position correction unit 211 corrects the formation position of the image formed on the first side of the sheet in accordance with the first correction condition, and corrects the formation position of the image formed on the second side of the sheet in accordance with a second correction condition. Thereby, the image formation position is corrected with good precision on both sides of the sheet.

As described using FIG. 8, the image scanner 100 may measure the first half portions and the second half portions of the measurement images separately. The position calculation unit 213 may create a result of measuring the measurement image by combining the read result of the first half portion and the read result of the second half portion of the measurement image. Thereby, since the edge detection precision of the end portion of the measurement chart improves, the image formation position correction precision improves.

The position calculation unit 213 may comprise an automatic mode for generating a correction condition based on the result of measuring the measurement image, and a manual mode for generating a correction condition based on numeric values inputted by a user after measuring them for a measurement image formed on a sheet. In particular, in the automatic mode, the user does not need to directly measure the measurement chart, and so usability improves. Because the image scanner 100 is not used in the manual mode, it is possible to avoid the influence of an individual difference of the image scanner 100.

As described using FIG. 5, the printer engine 150 may form measurement images at the top-left corner, the bottom-left corner, the top-right corner, and the bottom-right corner of the sheet. As described using FIG. 9A and FIG. 9B, the position calculation unit 213 decides a first straight line that connects the measurement image formed in the top-left corner of the sheet and the measurement image formed in the bottom-left corner of the sheet. Furthermore, the position calculation unit 213 decides a second straight line that passes through the measurement image formed in the top-left corner of the sheet and is orthogonal with the first straight line. The position calculation unit 213 decides a third straight line connecting a measurement image formed in the bottom-right corner of the sheet and the measurement image formed in the top-right corner of the sheet. The position calculation unit 213 decides the intersection point between the second straight line and the third straight line to be the right angle ideal point PD. The position calculation unit 213 decides the distance between the right angle ideal point PD and the measurement image formed in the top-right corner of the sheet to be a squareness misalignment δt added due to the printer engine 150. The position calculation unit 213 may decide the squareness correction amount d by adding the measurement error δ caused by the individual difference of the image scanner 100 to the misalignment δt of the squareness, and generate the correction condition using the squareness correction amount d.

The present invention can take embodiments as, for example, a system, an apparatus, a method, a program, a recording medium (storage medium) or the like. The present invention can be achieved by supplying a software program for realizing one or more functions of the previously described embodiments to a system or an apparatus directly or remotely, and by a computer of the system or apparatus reading and executing the supplied program code. Note that a program here means a program that a computer can read and corresponding to the flowcharts illustrated in the figures of the embodiment. Accordingly, to realize function processing of the present invention by a computer, the program code itself that is installed on the computer realizes the present invention. That is, the present invention includes the computer program itself which is for realizing the functions and processing of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-222439, filed Nov. 12, 2015, which is hereby incorporated by reference herein in its entirety.

What is claimed is:

1. An image forming apparatus comprising:
a reader having a carriage that moves in a predetermined direction and illuminates an original, the reader being configured to read the original to generate image data;
an image forming unit configured to form an image on a sheet;
a memory configured to store an adjustment condition for reducing a read error caused by an individual difference of the reader; and
a processor configured to perform:
(1) a generation task that (a) controls the image forming unit to form a measurement image on a sheet, (b) obtains read data corresponding to a result of reading the measurement image by the reader, and (c) generates a correction condition based on the read data and the adjustment condition; and
(2) an image formation task that (a) performs an image processing to image data based on the correction condition, and (b) controls the image forming unit to form the image on the sheet based on the image data to which the image processing was performed,
wherein the processor, based on the correction condition, corrects a position at which the image is formed on the sheet,
wherein the measurement image includes marks formed in corners of the sheet,
wherein the image forming unit forms the measurement image in each of a top-left corner, a bottom-left corner, a top-right corner, and a bottom-right corner of the sheet, and
wherein the generation task (1) decides a first straight line that connects the measurement image formed in the top-left corner of the sheet and the measurement image formed in the bottom-left corner of the sheet, (2) decides a second straight line that passes through the measurement image formed in the top-left corner of the sheet and is orthogonal with the first straight line, (3) decides a third straight line that connects the measurement image formed in the bottom-right corner of the sheet and the measurement image formed in the top-right corner of the sheet, (4) decides an intersection point between the second straight line and the third straight line to be a right angle ideal point, (5) decides a distance between the right angle ideal point and the measurement image formed in the top-right corner of the sheet to be a squareness misalignment added due to the image forming unit, (6) decides a squareness correction amount by adding a measurement error caused by the individual difference of the reader to the misalignment of the squareness, and (7) generates the correction condition using the squareness correction amount.

2. An image forming apparatus comprising:
a reader having a carriage that moves in a predetermined direction and illuminates an original, the reader being configured to read the original to generate original image data;
an image forming unit configured to form an image on a sheet based on the original image data;
a memory configured to store a correction condition for reducing a read error of the reader; and
a processor configured to perform tasks comprising:
(1) a test image forming task that controls the image forming unit to form a test image on the sheet, wherein the test image is used for detecting a position of an image to be formed on the sheet by the image forming unit;
(2) a generation task that generates a conversion condition based on read data related to the test image formed on the sheet and the correction condition stored in the memory, wherein the read data is output by the reader; and
(3) a conversion task that converts the image data based on the conversion condition,
wherein the image forming unit forms an output image on the sheet based on the converted image data.

3. The image forming apparatus according to claim 2, wherein the reader includes a rail, and the carriage is conveyed along the rail.

4. The image forming apparatus according to claim 2, wherein the correction condition reduces a read error occurring due to movement of the carriage.

5. The image forming apparatus according to claim 2, wherein the test image includes a first test image and a second test image,
wherein the first test image is formed on a first face of the sheet, and
wherein the second test image is formed on a second face of the sheet different from the first face.

6. The image forming apparatus according to claim 5, wherein the first test image and the second test image include marks formed in corners of the sheet.

7. The image forming apparatus according to claim 5, wherein the image forming unit includes a fixing unit configured to fix the image on the sheet, and
wherein the test image forming task (i) controls the image forming unit to form the first test image on the first face of the sheet, (ii) controls the fixing unit to fix the first test image on the first face of the sheet, (iii) controls the image forming unit to form the second test image on the second face of the sheet, and (iv) controls the fixing unit to fix the second test image on the second face of the sheet.

8. The image forming apparatus according to claim 2, wherein the test image is used for detecting a misalignment between a position of an image to be formed on the sheet by the image forming unit and a target position.

9. The image forming apparatus according to claim 2, wherein the correction condition corresponds to a squareness misalignment which is inherent for the reader.

* * * * *